(12) United States Patent
    Kivi (10) Patent No.: US 11,650,131 B2
(45) Date of Patent: May 16, 2023

(54) DETERMINING A CONDITION OF A STRUCTURAL PART OF A WORKING MACHINE

(71) Applicant: PONSSE OYJ, Vieremä (FI)

(72) Inventor: Aleksi Kivi, Vieremä (FI)

(73) Assignee: PONSSE OYJ, Vieremä (FI)

( * ) Notice: Subject to any disclaimer, the term of this patent is extended or adjusted under 35 U.S.C. 154(b) by 127 days.

(21) Appl. No.: 17/271,868

(22) PCT Filed: Aug. 28, 2019

(86) PCT No.: PCT/FI2019/050608
§ 371 (c)(1),
(2) Date: Feb. 26, 2021

(87) PCT Pub. No.: WO2020/043945
PCT Pub. Date: Mar. 5, 2020

(65) Prior Publication Data
US 2021/0190639 A1    Jun. 24, 2021

(30) Foreign Application Priority Data
Aug. 29, 2018 (FI) ...................................... 20180097

(51) Int. Cl.
*G01M 17/007* (2006.01)
*G01M 5/00* (2006.01)
(Continued)

(52) U.S. Cl.
CPC ......... *G01M 17/007* (2013.01); *A01G 23/006* (2013.01); *G01M 5/0033* (2013.01); *G01M 5/0041* (2013.01); *G07C 5/0808* (2013.01)

(58) Field of Classification Search
CPC ............. G01M 17/007; G01M 5/0033; G01M 5/0041; G01M 13/00; A01G 23/006; A01G 23/003; G07C 5/0808
See application file for complete search history.

(56) References Cited

U.S. PATENT DOCUMENTS 4,480,480 A    11/1984   Scott et al.
4,740,084 A *  4/1988    Curby .................... G01C 19/70
                                                    356/476
(Continued)

FOREIGN PATENT DOCUMENTS

CN    102459766    5/2012
CN    104603579    5/2015
(Continued)

OTHER PUBLICATIONS

International Search Report for PCT/FI2019/050608, dated Oct. 22, 2019, 4 pages.
(Continued)

*Primary Examiner* — Natalie Huls
*Assistant Examiner* — Cynthia L Davis
(74) *Attorney, Agent, or Firm* — Nixon & Vanderhye PC (57) ABSTRACT

A condition of at least one structural part (11', 11") of a working machine (10) is determined by detecting (201) a force of a changing magnitude to a first structural part (11') or a structural part connecting the first structural part (11') to the second structural part (11"), determining (203) a change in the position of the first structural part with respect to the second structural part as a function of the force detected, and determining (205) the condition on the basis of the change in the position of the first structural part with respect to the second structural part as a function of the force detected. At least a slope of the change in the magnitude of the force is detected.

23 Claims, 4 Drawing Sheets

(51) Int. Cl.
 *A01G 23/00* (2006.01)
 *G07C 5/08* (2006.01)

(56) References Cited

U.S. PATENT DOCUMENTS

| | | | |
|---|---|---|---|
| 5,881,971 A | 3/1999 | Hickman | |
| 7,930,112 B2* | 4/2011 | Mattes | G01M 5/0033 |
| | | | 702/36 |
| 8,855,943 B1 | 10/2014 | Matsui et al. | |
| 9,856,967 B2 | 1/2018 | Morselli et al. | |
| 2002/0095986 A1 | 7/2002 | Ito et al. | |
| 2009/0306909 A1 | 12/2009 | Mattes | |
| 2010/0065155 A1 | 3/2010 | Peltomae et al. | |
| 2010/0152925 A1 | 7/2010 | Goupil et al. | |
| 2014/0046614 A1 | 2/2014 | Pettersson | |
| 2015/0088372 A1 | 3/2015 | Nower et al. | |
| 2015/0308933 A1* | 10/2015 | Liu | G01N 3/08 |
| | | | 73/11.04 |
| 2016/0097694 A1 | 4/2016 | Lysenko et al. | |
| 2018/0156696 A1 | 7/2018 | Warren et al. | |

FOREIGN PATENT DOCUMENTS

| | | |
|---|---|---|
| DE | 20 2012 009 031 U1 | 10/2013 |
| EA | 27344 | 7/2017 |
| EP | 0 074 697 | 3/1983 |
| EP | 3 318 373 | 5/2018 |
| FI | 121705 | 3/2011 |
| JP | 2001-304380 | 10/2001 |
| JP | 2002/0181670 | 6/2002 |
| JP | 2015-123520 | 7/2015 |
| RU | 2429459 | 9/2011 |
| WO | 2006/128786 | 12/2006 |
| WO | 2016/020360 | 2/2016 |
| WO | WO-2016020360 A1 * | 2/2016 ......... G01M 99/007 |

OTHER PUBLICATIONS

Written Opinion of the ISA for PCT/FI2019/050608, dated Oct. 22, 2019, 6 pages.
International Preliminary Report on Patentability with Amended Sheets, for PCT/FI2019/050608, completed Aug. 28, 2020, 17 pages.
Finnish Search Report for FI App. No. 20180097 dated Feb. 7, 2019, 2 pages.
Decision to Grant dated Feb. 17, 2022 in corresponding Russian Application No. 2021106809 (with translation), 19 pages.
Extended European Search Report dated May 12, 2022 in corresponding European Application No. 19853591.6, 7 pages.
Office Action dated Sep. 27, 2022 in corresponding Chinese Application No. 201980056005.7 (with translation), 25 pages.
Office Action dated Sep. 14, 2022 in corresponding Finnish Application No. 20180097, 4 pages.

* cited by examiner

DETERMINING A CONDITION OF A STRUCTURAL PART OF A WORKING MACHINE

This application is the U.S. national phase of International Application No. PCT/FI2019/050608 filed 28 Aug. 2019, which designated the U.S. and claims priority to FI Patent Application No. 20180097 filed 29 Aug. 2018, the entire contents of each of which are hereby incorporated by reference.

BACKGROUND

The invention relates to working machines, and more particularly to determining a condition of a structural part of a working machine.

Inspecting a condition of a working machine using the known methods has typically required clean, controlled environment and special equipment. Therefore, it has often been necessary to transport the working machine to a specific maintenance site for checking condition, such as changes in clearances and gaps in joints due to wear, of the working machine. This has meant breaks in the production, which has led to less frequent inspections to avoid maintenance breaks and financial losses. On the other hand, the less frequent inspection increase the risk of unplanned breakdowns.

BRIEF DESCRIPTION

An objective of the present invention is thus to provide a new method, arrangement, working machine and computer program product. The object is achieved by a method, arrangement, working machine and computer program product characterized by what is stated in the independent claims. Some preferred embodiments are disclosed in the dependent claims.

The invention is based on the idea of using force and position measurements to determine a condition of a working machine. More particularly, a force is detected to cause a change in a mutual position of two structural parts of a working machine and the condition is determined on the basis of the change in the mutual position of the first structural parts as a function of the force detected.

An advantage of the method and arrangement is that it enables determining the condition of the working machine practically anywhere, such as on site, in some cases even during normal working cycle. This enables avoiding or minimizing maintenance breaks for this measurement purpose and, on the other hand, more frequent determining of the condition. Thereby wear can be detected as early as possible and necessary maintenance breaks for replacing spare parts and similar can be planned well ahead. This also means that different maintenance tasks can be combined to minimize the number of maintenance breaks and risks of unplanned breaks caused by worn and/or broken parts and even risks of injury caused by them can be minimized.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

A working machine may comprise any working machine comprising at least two structural parts, a first structural part and a second structural part. Depending on the embodiment, the first structural part and the second structural part may be connected to one another directly or indirectly. The first and second structural part being connected directly refers to the first structural part and the second structural part being connected to one another without any intermediate part or structure. The first and second structural part being connected indirectly refers to the first structural part and the second structural part being connected to one another by means of one or several other parts and/or structures, such as at least one joint, actuator, bearing, gear, connector and/or fastener.

Both in embodiments, where the first structural part and the second structural part are connected directly and where the first structural part and the second structural part are connected indirectly, the movement of the first structural part and the second structural part is limited in at least one direction of movement. The direction of movement, in which the movement is limited, may be translational or rotational. According to an embodiment, the mutual movement of the first structural part and the second structural part may be limited in more than one translational and/or rotational direction of movement.

According to an embodiment, the movement of the first structural part and the second structural part with respect to one another in at least one direction of movement may be limited completely, whereby the first structural part and the second structural part are connected to one another fixedly in this direction of movement.

According to an embodiment, the movement of the first structural part and the second structural part with respect to one another in at least one direction of movement may be limited partly, whereby the movement of the first structural part with respect to the second structural part is enabled, but limited in magnitude. Depending on the direction of movement in question, the magnitude may comprise a maximum angle or a maximum distance of the allowed mutual movement.

According to an embodiment, the first structural part may be connected to the second structural part by a form lock. The form lock refers to the first structural part and the second structural part or another other part or structure connecting the first structural part to the second structural part comprising a form and a counter form that, when provided against one another, limit the mutual movement of the first and the second structural parts in at least one direction of movement.

According to an embodiment, the working machine may comprise a mobile working machine. This is beneficial, as mobile working machines are typically used in environments that are not optimal for traditional ways of inspecting conditions, such as wear, gaps and clearances, of the working machine structural parts and joints, and/or remotely from maintenance sites and equipment. According to an embodiment, the working machine may comprise a forest machine. This is particularly beneficial, as forest machines are typically used far away from maintenance sites and equipment and in conditions particularly challenging for traditional methods of inspecting wear, gaps and clearances and other similar conditions of the working machine.

Figure 1:
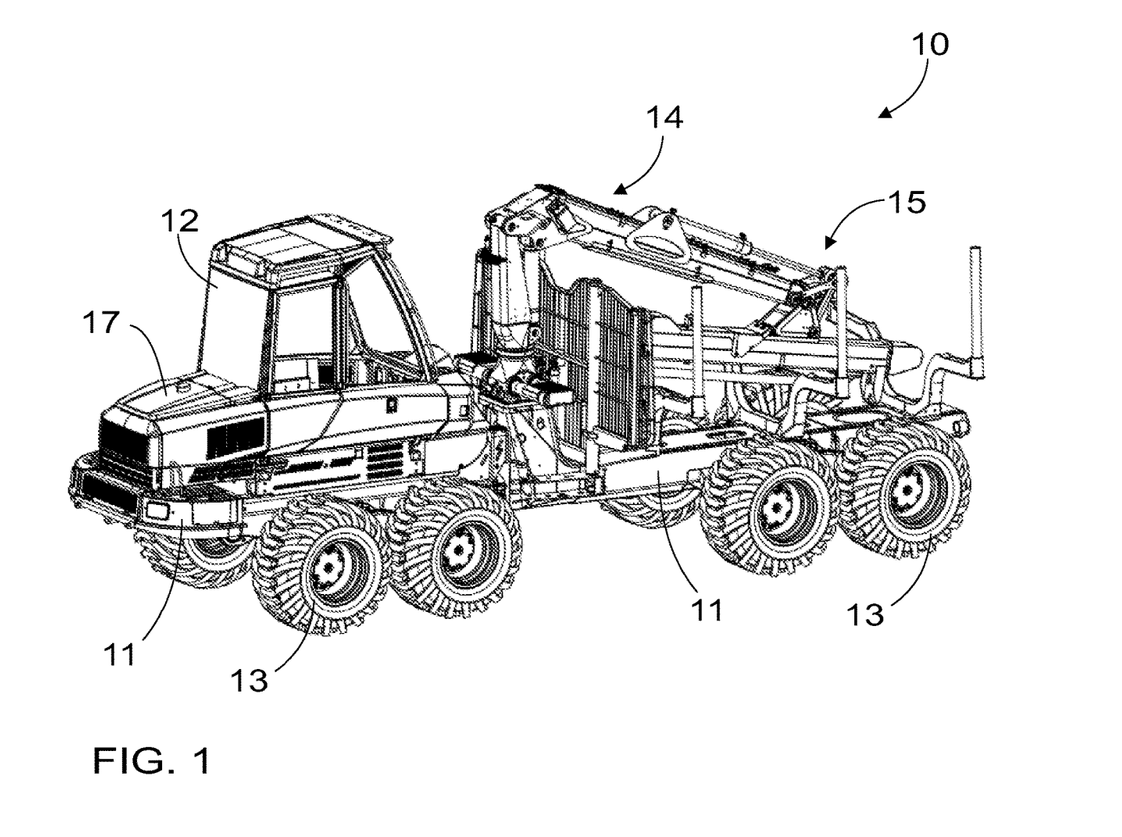
FIG. 1 illustrates a working machine.

FIG. 1 illustrates a working machine 10. The work machine in FIG. 1 is a forest machine, more particularly a forwarder. However, the present solution is applicable for other types of forest machines, such as harvesters, as well as mobile working machines and other types of working machines too and the forwarder is shown to illustrate typical structural parts and principles of a (mobile) working machine only.

A working machine 10 may comprise one, two or more frame parts 11. A working machine may also comprise a cabin 12 arranged in at least one of the frame parts 11. Furthermore, a working machine 10, more particularly a mobile working machine, may comprise moving equipment 13. The moving equipment 13 may comprise at least one of the following: wheels, continuous tracks and other moving elements for moving a working machine with respect to ground or other working platform known as such. According to an embodiment, the working machine 10 may also comprise a boom 14. In the embodiment of FIG. 1, the working machine 10 further comprises other structural parts, such as a load space 15, a tool (not shown), such as a harvester head or a grapple, and a power source 17.

Figure 2:
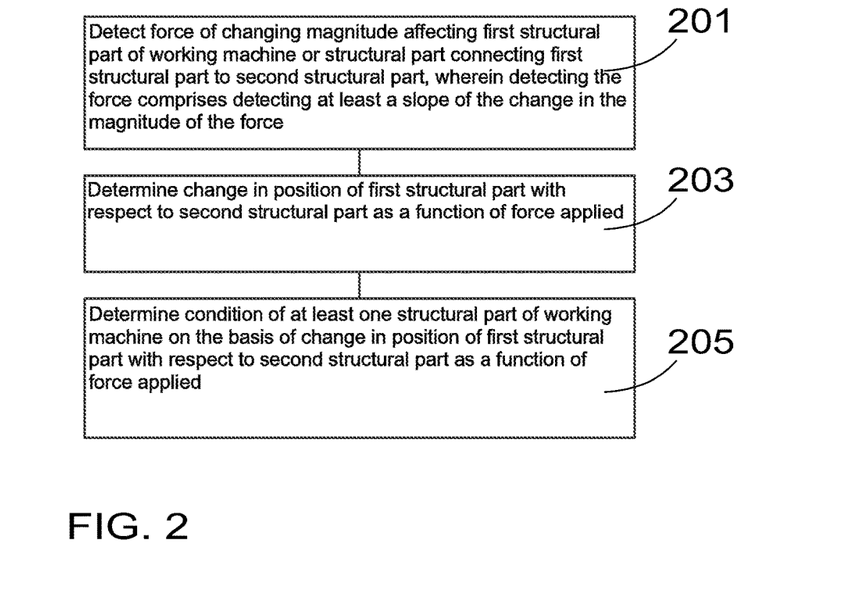
FIG. 2 illustrates a method for determining a condition of at least one structural part of a working machine.

FIG. 2 illustrates a method of determining a condition of at least one structural part of a working machine. The condition may be determined for the first structural part 11', the second structural part 11", or a structural part 16 connecting the first and second structural parts 11', 11" to one another. Each of the first structural part 11' and the second structural part 11" may comprise at least one of the following or a part thereof: a frame part 11, a cabin 12, a piece of mobbing equipment 13, a boom 14, a boom section, a load space 15, a tool and a power source 17. Each of the first structural part 11' and the second structural part 11" may also comprise in addition to or instead of the above mentioned structural parts any other structural part of the working machine 10 known as such.

The method may comprise detecting 201 a force of a changing magnitude affecting the first structural part 11' of the working machine 10 or a structural part 16 connecting the first structural part 11' to the second structural part 11". At least a slope of the change in the magnitude of the force is detected. The force may comprise a force applied to the first structural part 11' directly causing a direct force affecting the first structural part 11' or a force provided at a distance from the first structural part 11' or a middle or a joining point thereof and transferred thereto, whereby the force causes a moment applied to the first structural part 11'. The force may comprise of one force or a resultant force caused by several forces directed in same direction and/or in different directions. Such forces may be applied by same or different external actuators and/or actuators or other structural parts of the working machine 10.

In this description, the slope of change in the magnitude of the force refers to the first derivative of the force, in other words a force curve drawn with time, or with other variable, on the x-axis and force on the y-axis. In other words, the slope of the force curve refers to the speed of change in the magnitude of the force at a given moment and thus defines the slope of change in the magnitude of the force.

Figure 3:
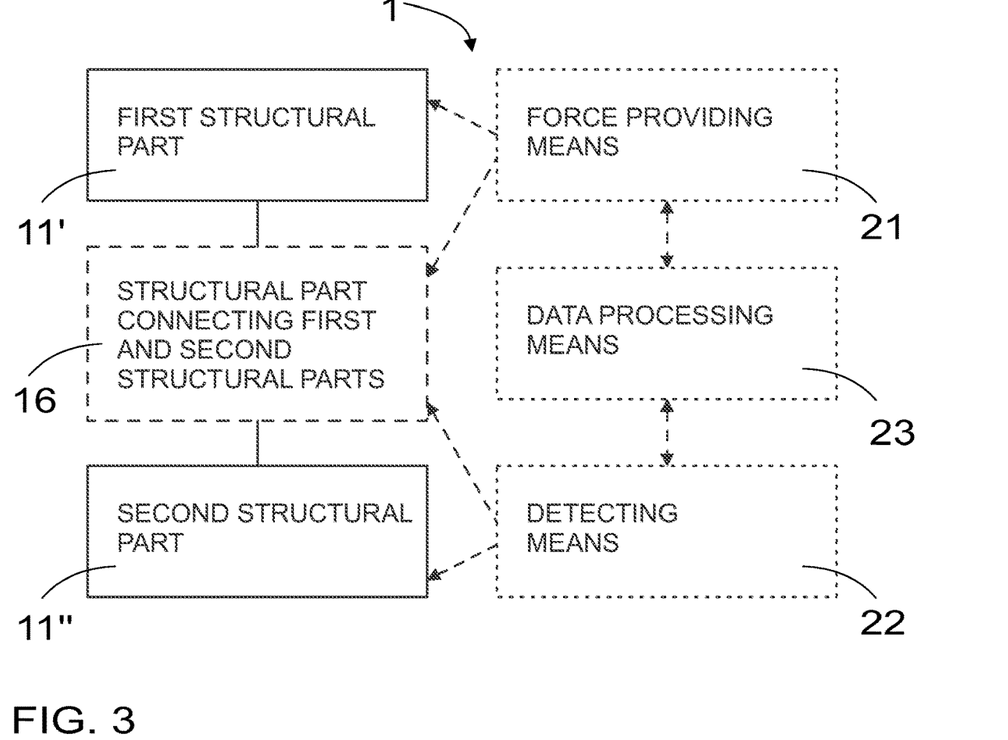
FIG. 3 illustrates an arrangement 1 for determining a condition of at least one structural part of a working machine.

Detecting the force and its magnitude may be implemented for instance by detecting means 22, by force providing means 21 or by data processing means 23. On one hand, the force and/or its magnitude may be detected by detecting means 22 for instance by sensing, measuring or calculating the force. The sensing or measuring the force may be implemented by a weighing device or a pressure sensor, for example. On the other hand, the force and/or its magnitude may be detected by force providing means 21 for instance by determining the force provided and/or applied to the first structural part 11' or the structural part 16 connecting the first structural part 11' to the second structural part 11". The force and/or its magnitude may also be detected by data processing means 23, for instance on the basis of data provided by a control system of the working machine 10.

The slope of the change in the magnitude of the force refers to the information about the mutual position of the first and second structural part 11', 11" corresponding to a force of a detected or known magnitude affecting the first structural part 11' or the structural part 16 connecting the second structural part 11" to the first structural part 11'. This means that information about at least two magnitudes of the force affecting the first structural part 11' or the structural part 16 connecting the first structural part 11' to the second structural part 11" are needed. One of these magnitudes may comprise no force being applied to the first structural part 11' or the structural part 16 connecting the first structural part 11' to the second structural part 11". In other words, the magnitude of the external force may be 0. Thereby, at least one magnitude of the force affecting the first structural part 11' or the structural part 16 connecting the first structural part 11' to the second structural part 11", namely the second magnitude, is detected by measuring, calculating or being determined in some other suitable manner. Such a state, where the magnitude of external force applied to the first structural part 11' and/or the structural part 16 connecting the first structural part 11' to the second structural part 11" is 0, may be arranged for instance by arranging the boom 14 to a position where no force is applied to the boom 14 and/or a joint connecting sections of the boom or connecting the boom 14 to a frame part 11, for example. Naturally, both magnitudes of the force may be different from 0 and/or both magnitudes of force may be measured, calculated or determined in some other suitable manner.

The method may further comprise determining 203 a change in the position of the first structural part 11' with respect to the second structural part 11" as a function of the force detected. According to an embodiment, determining 203 a change in the position of the first structural part 11' with respect to the second structural part 11" may comprise determining the position of the first structural part 11' with respect to the second structural part 11" at a first instant of time, when a force of a first known magnitude is detected to affect the first structural part 11'; determining the position of the first structural part 11' with respect to the second structural part 11" at a second instant of time, when a force of a second known magnitude is detected to affect the first structural part 11'; and determining 203 the change in the position of the first structural part 11' with respect to the second structural part 11" based on these determined positions.

According to another embodiment, determining 203 a change in the position of the first structural part 11' with respect to the second structural part 11" may comprise determining the change in the position of the first structural part 11' with respect to the second structural part 11" between a first instant of time, when a force of a first known magnitude is detected to affect the first structural part 11', and a second instant of time, when a force of a second known magnitude is detected to affect the first structural part 11', directly. This may be implemented for instance by using the first position as a reference position and determining the second position with respect to that reference position, or by measuring the change in the position in some other way known as such.

The position of the first structural part 11' with respect to the second structural part 11" refers to mutual translational and/or rotational position of the first and second structural parts 11', 11". In other words, one or both of the first and second structural parts 11', 11" may rotate or move in a translational direction with respect to the other.

The method may further comprise determining 205 the condition of at least one structural part 11', 11", 16 of the working machine on the basis of the change in the position of the first structural part 11' with respect to the second structural part 11" as a function of the force detected. The change in the position of the first structural part 11' with respect to the second structural part 11" as a function of the force detected refers to the dependency between the force detected and the change in the mutual position of the first and second structural parts 11', 11".

In other words, in the method, arrangement, working machine and/or computer program product of this description the force affecting the first structural part 11' or a structural part 16 connecting the first structural part 11' to the second structural part 11" is arranged to cause a change in a mutual position between the first structural part 11' and the second structural part 11" of the working machine 10. The condition of at least one structural part 11', 11", 16 of the working machine 10 is then determined on the basis of the change in the mutual position of the first structural part 11' and the second structural part 11" as a function of the force detected.

According to an embodiment, the method further comprises applying and/or the arrangement, working machine and/or computer program product is further arranged to apply a force of a changing magnitude to the first structural part 11' of the working machine 10 or a structural part 16 connecting the first structural part 11' to the second structural part 11". At least a slope of the change in the magnitude of the force is detected.

According to an embodiment, the condition is determined for the first structural part 11'. In other words, in the method, arrangement and computer program product, the condition of the structural part the force affects, directly or indirectly, may be determined. According to another embodiment, in the method, arrangement and computer program product, the condition is determined for a second structural part 11" that is different from but arranged in connection with the first structural part 11'. Depending on the embodiment, the first structural part 11' and the second structural part 11" may be connected directly or indirectly, as explained above. According to a further embodiment, the condition is determined for a structural part 16 connecting at least two structural parts of the working machine, the first structural part 11' and the second structural part 11".

According to an embodiment, the condition is determined for a joint connecting at least two structural parts 11, 11', 11", 16 of the working machine. According to an embodiment, the first structural part 11' may comprise the joint. According to another embodiment, the first structural part 11' may comprise at least one of the structural parts 11, 11', 11", 16 connected to one another by the joint.

According to an embodiment, the condition of the at least one structural part may be determined on the basis of an angular coefficient of the change in the position of the first structural part 11', such as the position of the first structural part 11' with respect to the second structural part 11", as a function of the force detected. The angular coefficient describes the speed at which the force changes at a given moment. In embodiments, where the force increases or decreases at a constant speed, two measurement points, one of which may even be a 0 force, may be sufficient. In embodiments, where the force is constantly changing at varying speed, the angular coefficient may be determined at multiple measurement points or even continuously to determine the condition.

According to an embodiment, the condition of the at least one structural part 11', 11", 16 may comprise wear of the structural part. According to an embodiment, the wear of the at least one structural part 11', 11", 16 may comprise change in the clearance or gap in the connection between the first and the second structural parts 11', 11".

According to an embodiment, determining the condition of at least one structural part may comprise determining at least one of the following: a clearance of a structural part, a clearance of a joint of two structural parts, a deformation of a structural part, a deformation of a joint of two structural parts, a flex of at least one structural part, and a leak of a structural part.

A clearance or a gap may comprise for instance an axial bearing clearance, an actuator clearance, a transmission clearance and/or a mechanical clearance. The axial bearing clearance may comprise for instance a clearance in a joint or a telescopic mechanism. The actuator clearance may comprise for instance clearance in the actuator mounting means, for instance in the dimension of a mounting bracket, or a clearance in the dimensions of the actuator itself. The transmission clearance may comprise for instance a clearance in dimensions of a toothed transmission or other type of form-based transmission device. The mechanical clearance may comprise for instance a clearance in dimensions of a locking mechanism or mounting mechanism.

Figure 6:
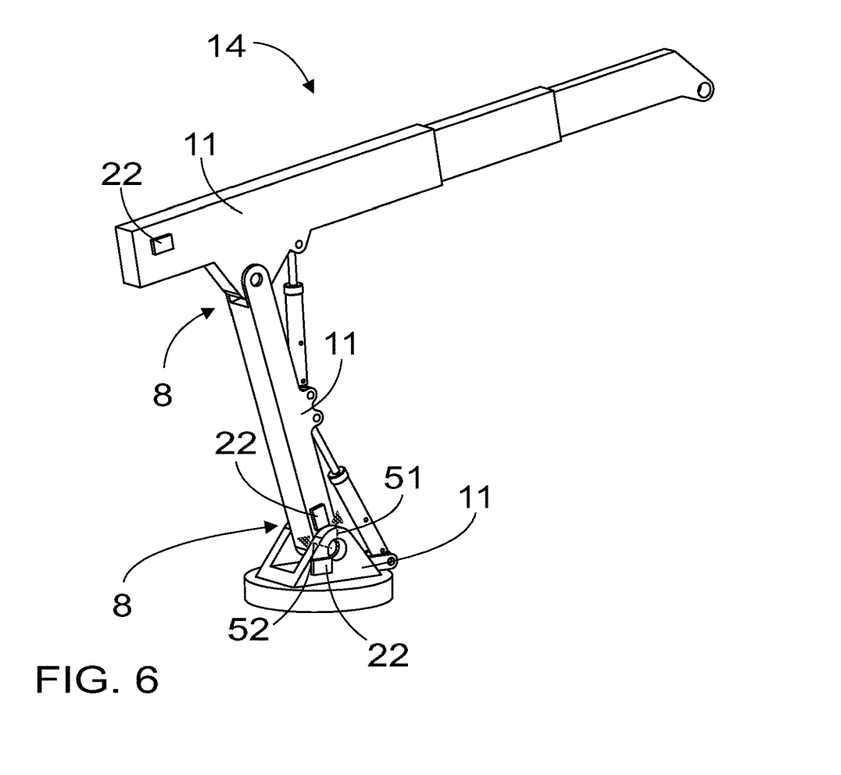
FIG. 6 illustrates schematically a boom of a working machine.

FIG. 6 illustrates schematically a boom of a working machine. FIG. 6 also illustrates a joint 8, more particularly two joints 8, and different types of clearance or gap in connection with such a joint. FIG. 6 illustrates the directions of a radial clearance 51 and axial clearance 52. FIG. 6 also illustrates an embodiment of providing detecting means 22 in at least two structural parts 11, more particularly in three structural parts 11. In such an embodiment, either one of the structural parts 11 provided with the detecting means 22 may comprise the first structural part 11', and one of the other structural parts 11 may comprise the second structural part 11". Depending on the embodiment, the force may affect one of the structural parts 11 or the structural part 16 connecting the second structural part to the first structural part, in this case the joint 8 connecting the structural parts 11. The detecting means 22 may comprise an inertia sensor, for example. The inertia sensor may comprise for instance an inertia measurement unit. The detecting means 22 may also comprise some other type of detecting means disclosed in this description.

According to an embodiment, the change in the position of the first structural part 11' with respect to the second structural part 11" is determined by determining the change in the position of the first structural part in relation to a second structural part directly. According to another embodiment, the change in the position of the first structural part 11' with respect to the second structural part 11" is determined by determining the change in the position of each one of the first structural part 11' and/or the second structural part 11" in relation to the ground or other working platform or surface of the working machine, and the change in the mutual position of the first and second structural parts 11', 11" is determined on the basis of this information.

According to an embodiment, the change in the position of the first structural part 11' may be determined by determining at least in one direction of measurement at least two different measured variables, a first and a second measured variable; receiving a first and a second measurement signal describing the first and the second measured variable in data processing means; and determining the change in the position of the first structural part on the basis of the first and the second measured variable.

Determining at least the two different measured variables for a direction of measurement and for a structural part enables using average values from the measurements and/or measurement errors occurring in a single measured variable and caused by various disturbances to be compensated for quickly and accurately. In such a case, by combining the signals of the acceleration sensor and/or the angular velocity sensor and/or the angular acceleration sensor in order to compensate for the measurement errors it is possible to calculate the angular position and/or angular velocity of each structural part in a reliable manner. Determining the angular position and the angular velocity on the basis of the measurement signals of an acceleration sensor, angular velocity sensor or an angular acceleration sensor is known per se and thus does not need to be explained in closer detail herein. An acceleration sensor and an inclinometer are based on detecting the acceleration of movement and the gravitational acceleration of a sensor, so in connection with the disclosed solutions these sensor types correspond to each other and can be considered equal in the disclosed solutions. The use of these detectors provides for instance the advantage that the position and/or state of motion information may be determined by small, inexpensive, reliable and long-lasting detectors, which may often also be arranged quite freely in the structural part being monitored. In comparison with the present solutions, durable articulation angle sensors and linear position sensors, for instance, are expensive.

According to an embodiment, the change in the position of the first structural part is determined by at least one of the following: an inclinometer, an acceleration sensor, an angular acceleration sensor, a gyroscope, a magnetometer, a capacitive distance sensor, an inertial measurement unit and an optical sensor.

According to an embodiment, the first and/or the second measurement signal may comprise at least one of the signals of the following: an inclinometer, an acceleration sensor, an angular acceleration sensor, a gyroscope, a magnetometer, a capacitive distance sensor, an inertial measurement unit and an optical sensor.

According to an embodiment, at least one measured variable the change in the position of the first structural part 11', for instance the first measured variable and/or the second measured variable, may comprise at least two of the following: acceleration, angular velocity, and angular acceleration.

According to an embodiment, the force is applied to the first structural part 11' by an actuator of the working machine 10 or at least one structural part of the working machine 10. In other words, the force needed to determine the condition of at least one structural part of the working machine may be provided by the working machine itself. This is beneficial, as thereby no external force providing means are needed for this purpose. Thus, the condition of the working machine may be determined even at a site where no such external force providing means are available. According to an embodiment, the force may be applied to the first structural part by a boom of the working machine, for example.

According to an embodiment, the force may be applied to the first structural part 11' by an actuator external to the working machine 10. This requires external equipment, but may enable more accurate control of the force applied, for example.

According to an embodiment, a predetermined time interval for determining the condition of the at least one structural part may be set.

According to an embodiment, the condition of the at least one structural part 11', 11", 16 may be determined automatically during normal use of the working machine 10, for instance at the predetermined time interval. This is particularly beneficial, as the normal use of the working machine does not need to be interrupted and no active actions are needed from the operator of the working machine. This makes it easier to continuously monitor the condition of the working machine and enables detecting early signs of wear, for example, giving more time and alternatives for planning maintenance actions. In such an embodiment, no separate test force is needed. Instead, the forces involved with normal use of the working machine 10, in other words forces related to implementing other functions of the working machine, may be used for determining the condition of the at least one structural part. According to another embodiment, data processing means of the working machine may be arranged to give an alert or a reminder to the operator at predetermined time intervals to determine the condition. Depending on the embodiment, the operator may comprise for instance an owner, a maintenance person, a driver or a manager of the working machine.

According to an embodiment, a control limit may be set for the condition of the at least one structural part 11', 11", 16. In addition, an action may be caused in response to the determined condition exceeding or going under the control limit. According to an embodiment, the action may comprises at least one of the following: causing an alert provided for an operator and affecting the operation of the working machine. Affecting the operation of the working machine may comprise limiting the operation of the working machine, such as limiting extreme positions or loads handled, or even stopping the operation of the working machine in case of increased risks.

FIG. 3 illustrates an arrangement 1 for determining a condition of at least one structural part 11', 11", 16 of a working machine 10. The arrangement 1 may comprise detecting means 22 arranged to determine a change in the position of the first structural part 11' of the working machine 10 with respect to the second structural part 11". The detecting means may comprise at least one detector, for example.

The arrangement may further comprise data processing means 23 arranged to determine the condition of at least one structural part 11', 11", 16 of the working machine 10 on the basis of the change in the position of the first structural part 11' with respect to the second structural part 11" as a function of the force detected. The data processing means 23 may further be arranged to implement one or more functions of the methods described in this description and the accompanying figures and/or to cause a working machine 10 and/or part(s), such as structural part(s), thereof to implement at least one or more functions of the methods described in this description and the accompanying figures.

According to an embodiment, the arrangement 1 may further comprise force providing means 21 arranged to apply the force of a changing magnitude to a first structural part 11' of the working machine 10. At least a slope of the change in the magnitude of the force may be known, as described above.

According to an embodiment, the detecting means 22, the data processing means 23 and/or the force providing means 21 may be arranged to detect at least the slope of the change in the magnitude of the force of changing magnitude affecting the first structural part 11'. According to an embodiment, the detecting means 22, the data processing means 23 and/or the force providing means 21 may be arranged to determine the change in the position of the first structural part 11' of the working machine 10 with respect to the second structural part 11" as a function of the force detected.

According to an embodiment, the force providing means may comprise an actuator of the working machine. According to another embodiment, the force providing means comprise an external actuator. According to a further embodiment, the force may be provided by driving the working machine 10 onto sloping or uneven ground. In such an embodiment, the force providing means may comprise structural parts of the working machine, such as drive transmission, at least one frame part 11, a boom 14 and/or moving equipment 13 of the working machine 10.

According to an embodiment, the detecting means may be arranged fixedly to the working machine. According to another embodiment, the detecting means comprise detecting means releasably connectable to the working machine and the data processing means.

According to an embodiment, a working machine may comprise an arrangement described above and/or be arranged to implement at least one of the steps of a method described above.

Figure 4:
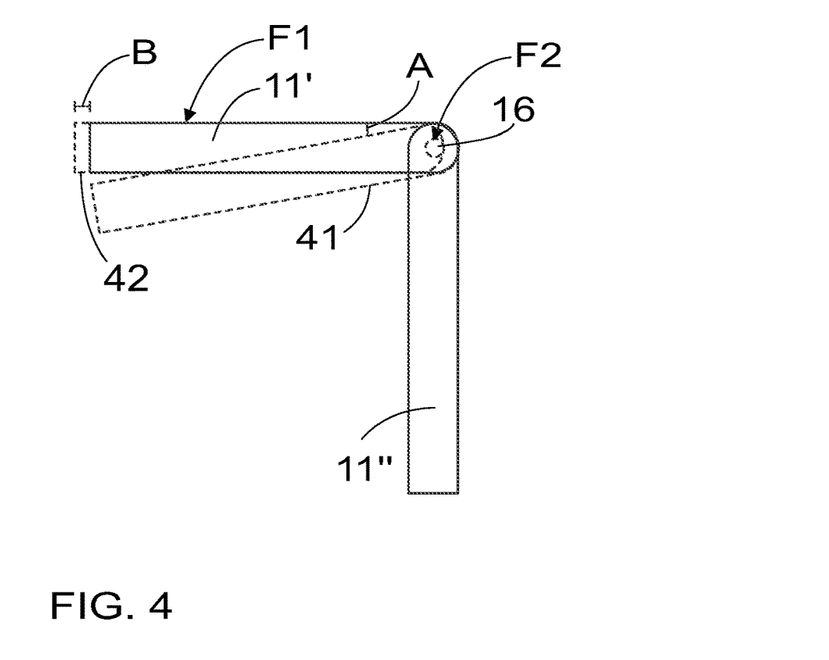
FIG. 4 illustrates schematically a first structural part and a second structural part of a working machine.

FIG. 4 illustrates schematically a first structural part 11' and a second structural part 11" of a working machine 10 and some basic concepts of the arrangement and method described above. According to an embodiment, the first structural part 11' and the second structural part 11" may be connected to one another by a structural part 16 connecting the first and second structural parts 11', 11" to one another. This optional structural part 16 connecting the first and second structural parts is shown in the FIG. 4 by a dashed line.

According to an embodiment, the force of a changing magnitude may affect the first structural part 11' of the working machine 10. In FIG. 4, this is illustrated by the arrow F1. According to another embodiment, the force of a changing magnitude may be affect the structural part 16 connecting the first structural part 11' to the second structural part 11". In FIG. 4, this is illustrated by the arrow F2.

According to an embodiment, the change in the position of the first structural part 11' with respect to the second structural part 11' may comprise a rotational change, such as the change of an angle A in the FIG. 4, when the changed position of the first structural part 11' with respect to the second structural part 11" is shown by a first dashed line 41. According to a second embodiment, the change in the position of the first structural part 11' with respect to the second structural part 11' may comprise a lateral change, such as the change of a distance B in the FIG. 4, when the changed position of the first structural part 11' with respect to the second structural part 11" is shown by a second dashed line 42. According to a third embodiment, the change in the position of the first structural part 11' with respect to the second structural part 11' may comprise a combination of a rotational change and a lateral change.

Figure 5:
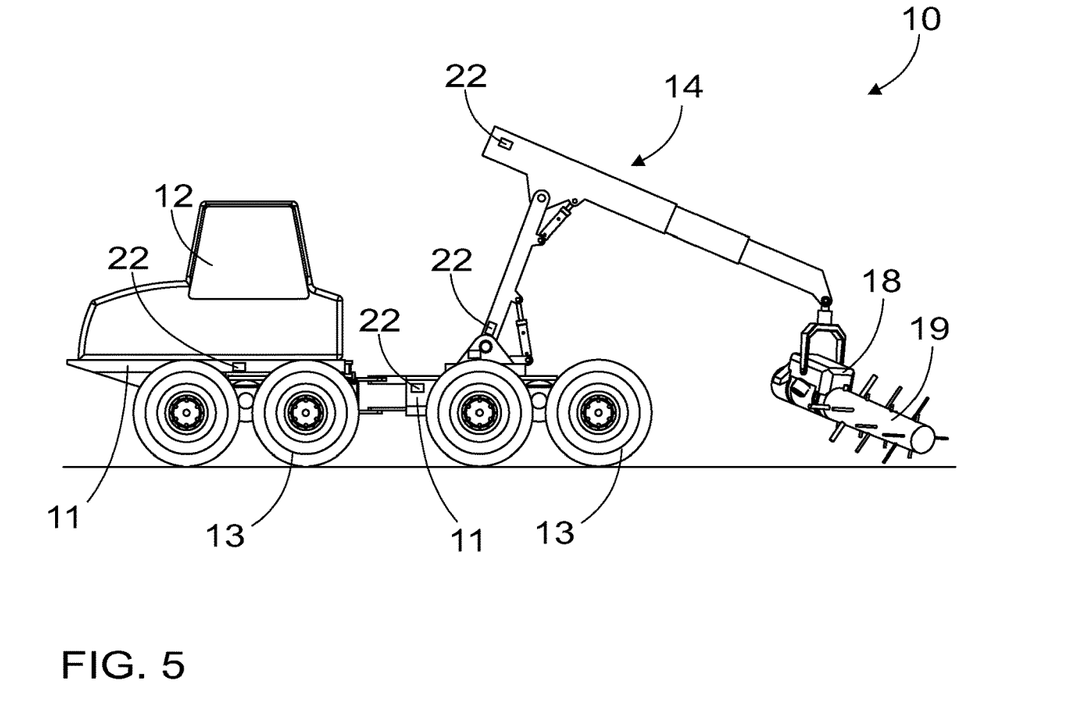
FIG. 5 illustrates an embodiment of a working machine.

FIG. 5 illustrates an embodiment of a working machine 10. In the embodiment of FIG. 5, the working machine 10 is a harvester. In FIG. 5, some of the structural parts of the working machine 10 are marked with reference numbers. Many of these structural parts may comprise structural parts similar to the working machine 10 of FIG. 1. On the other hand, the working machine 10 may also comprise structural parts different from the structural parts embodiment of FIG. 1 instead of or in addition to the structural parts described in connection with FIG. 1 and other embodiments described in this description. The working machine 10 may, for instance, comprise a tool 18, such as a harvester head. In FIG. 5, the harvester head is shown holding a trunk 19.

FIG. 5 also illustrates detecting means 22 provided in the working machine 10. The detecting means 22 shown in FIG. 5 only illustrate one embodiment and in different embodiments, a working machine 10 may comprise none, one, two or more than two of the detecting means 22 of FIG. 5 and/or one, two or multiple pieces of detecting means 22 not shown in FIG. 5. In the embodiment of FIG. 5, detecting means 22 are provided in two frame parts 11 and two boom sections of boom 14. According to another embodiments, detecting means 22 may be provided for instance in the cabin 12, a further boom section, the tool 18 and/or at least one other structural part of the working machine 10.

Figure 7:
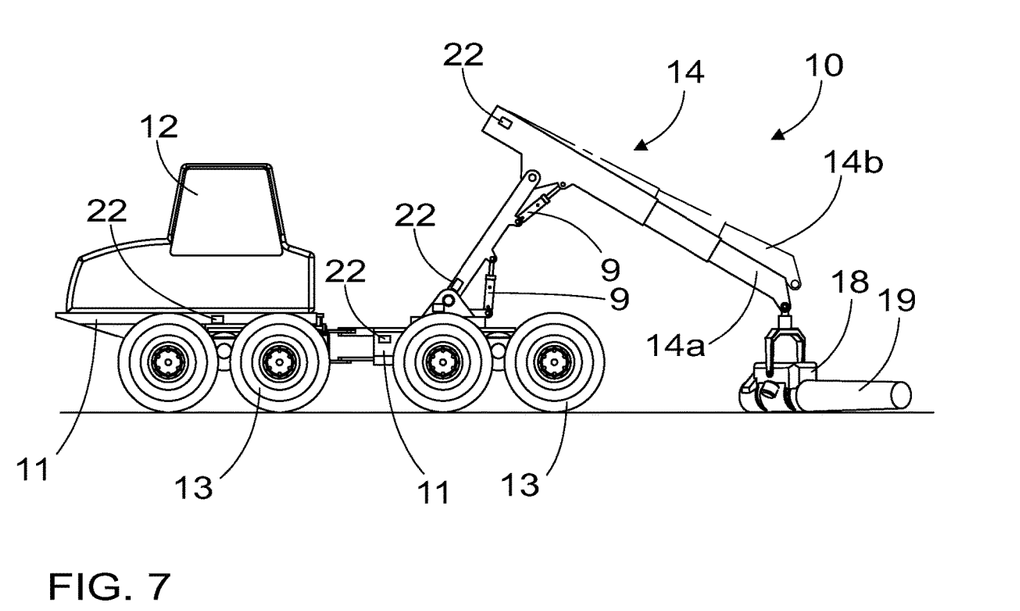
FIG. 7 illustrates schematically an embodiment of a working machine and a change in a position of a boom of the working machine.

FIG. 7 illustrates schematically an embodiment of a working machine 10 and a change in a position of a structural part, more particularly an outer section of a boom 14, of the working machine 10. FIG. 7 illustrates schematically a change in the position of the first structural part, more particularly the outer section of the boom 14, by showing a first position of the outer section of the boom by reference 14a and a second position of the outer section of the boom by reference 14b. Thereby, the change in the position of the outer section of the boom 14 comprises the difference between the position of the first position of the first structural part, namely the outer section of the boom 14, and the second position of the first structural part. The position of the first structural part 11' may refer to the position of the first structural part 11' with respect to a second structural part 11". In the embodiment of FIG. 7, the second structural part 11" may comprise the inner section of the boom 14, in other words the section of the boom 14 articulated to a frame part 11, or the frame part 11, for example. The change in the position of the first structural part 11' with respect to the second structural part 11" may be detected by the detecting means 22, for example.

Detecting means 22, force providing means 21 (not shown) and/or data processing means 23 (not shown) may be arranged to detect at least a slope of change of a force of a changing magnitude affecting the first structural part 11', in this case the outer section of the boom 14, of the working machine 10. At a first point of time, for instance when the outer section of the boom is in the position 14a, a force of a first magnitude may affect the first structural part 11', namely the outer section of boom 14. At a second point of time, for instance when the outer section of the boom is in the position 14b, a force of a second magnitude may affect the first structural part 11', namely the outer section of the boom 14. The change in the magnitude of the force may comprise the difference in the magnitude between the force of the first magnitude and the force of the second magnitude.

In the embodiment of FIG. 7, the force of the first magnitude may be 0, if the trunk 19 is laid against the ground in the first position of the boom, for example. In the embodiment of FIG. 7, the force may be provided by force providing means 21, for instance by one or more of the actuators 9, such as one or more pressure medium cylinders, of the working machine 10, by at least one structural part of the working machine, or by an external actuator, for example. The force provided by the at least one structural parts of the working machine may comprise a force caused by the weight of a structural part, such as the boom 14, for example.

Data processing means 23 (not shown) may be arranged to determine the condition of at least one structural part of the working machine, such as the outer section of the boom 14, the joint articulating the outer section of the boom 14 to the inner section of the boom 14 or the frame part 11, or the joint connecting the boom 14 to the frame part 11. The condition may be determined on the basis of the change in the position of the first structural part with respect to the second structural part as a function of the force detected.

A computer program product may be in storage on a computer readable medium and executable with a processor. The computer program product may comprise a computer readable program code, which is arranged to carry out steps of a method as set forth above or a combination thereof, as the program code is being executed with the processor. The processor may comprise the data processing means of the working machine.

It will be obvious to a person skilled in the art that, as the technology advances, the inventive concept can be implemented in various ways. The invention and its embodiments are not limited to the examples described above but may vary within the scope of the claims.

The invention claimed is:

1. A method of determining a condition of at least one structural part of a mobile working machine, wherein the mobile working machine comprises at least two structural parts, a first structural part and a second structural part, the first and second structural parts being connected to one another directly or indirectly, the method comprising:
   detecting a force of a changing magnitude affecting the first structural part of the mobile working machine or a structural part connecting the first structural part to the second structural part, wherein at least a slope of the change in the magnitude of the force is known,
   determining a change in a position of the first structural part with respect to the second structural part as a function of the force detected, and
   determining the condition of at least one structural part of the mobile working machine based on the change in the position of the first structural part with respect to the second structural part as a function of the force detected,
   wherein determining the condition of at least one structural part comprises determining at least one of the following: a clearance of a structural part, a clearance of a joint of two structural parts, a deformation of a structural part, a deformation of a joint of two structural parts, a flex of at least one structural part, and a leak of a structural part, and
   wherein the force is applied to the first structural part by an actuator of the mobile working machine, at least one structural part of the mobile working machine or by an actuator external to the mobile working machine.

2. A method according to claim 1, wherein the condition is determined for the first structural part.

3. A method according to claim 1, wherein the condition is determined for a second structural part that is different from but arranged in connection with the first structural part.

4. A method according to claim 1, wherein the condition is determined for a joint connecting at least two structural parts of the mobile working machine.

5. A method according to claim 4, wherein the first structural part comprises the joint.

6. A method according to claim 4, wherein the first structural part comprises at least one of the structural parts connected to one another by the joint.

7. A method according to claim 1, wherein the condition of the at least one structural part is determined based on an angular coefficient of the change in the position of the first structural part as a function of the force detected.

8. A method according to claim 1, wherein the condition of the at least one structural part comprises wear of the structural part.

9. A method according to claim 1, wherein the change in the position of the first structural part is determined by at least one of the following: an inclinometer, an acceleration sensor, an angular acceleration sensor, a gyroscope, a magnetometer, a capacitive distance sensor, an inertial measurement unit and an optical sensor.

10. A method according to claim 1, wherein the force is applied to the first structural part by a boom of the mobile working machine.

11. A method according to claim 1, wherein the method further comprises setting a predetermined time interval for determining the condition of the at least one structural part.

12. A method according to claim 11, wherein the method further comprises determining the condition of the at least one structural part automatically at the predetermined time interval during normal use of the mobile working machine.

13. A method according to claim 1, wherein the method further comprises:
   setting a control limit for the condition of the at least one structural part, and
   causing an action in response to the determined condition exceeding or going under the control limit.

14. A method according to claim 13, wherein the action comprises at least one of the following: causing an alert provided for an operator and affecting the operation of the mobile working machine.

15. A method according to claim 1, wherein one of the magnitudes of the force of changing magnitude comprises no force being applied to the first structural part or the structural part connecting the first structural part to the second structural part.

16. An arrangement for determining a condition of at least one structural part of a mobile working machine, wherein the arrangement comprises:
   detecting means arranged to determine a change in a position of a first structural part of the mobile working machine with respect to the second structural part, and
   data processing means arranged to determine the condition of at least one structural part of the mobile working machine based on the change in the position of the first structural part with respect to the second structural part as a function of the force detected,
   wherein the detecting means and the data processing means are arranged to detect at least a slope of the change in the magnitude of the force of changing magnitude affecting the first structural part and to determine the change in the position of the first structural part of the mobile working machine with respect to the second structural part as a function of the force detected.

17. An arrangement according to claim 16, wherein the arrangement further comprises force providing means, wherein the force providing means are arranged to apply the force of a changing magnitude to a first structural part of the mobile working machine, and wherein at least the change in the magnitude of the force is known.

18. An arrangement according to claim 17, wherein the force providing means comprise an actuator of the mobile working machine or at least one structural part of the mobile working machine.

19. An arrangement according to claim 16, wherein the detecting means are arranged fixedly to the mobile working machine.

20. An arrangement according to claim 16, wherein the detecting means comprise detecting means releasably connectable to the mobile working machine and the data processing means.

21. An arrangement according to claim 17, wherein the force providing means comprise an external actuator.

22. A mobile working machine comprising an arrangement according to claim 14.

23. A non-transitory computer program product comprising computer readable program code that, when executed by a processor, is arranged to cause an arrangement to determine a condition of at least one structural part of a mobile working machine, wherein the mobile working machine comprises at least two structural parts, a first structural part and a second structural part, the first and second structural parts being connected to one another directly or indirectly, the condition being determined by performing operations comprising:
  detecting a force of a changing magnitude affecting the first structural part of the mobile working machine or a structural part connecting the first structural part to the second structural part, wherein at least a slope of the change in the magnitude of the force is known,
  determining a change in a position of the first structural part with respect to the second structural part as a function of the force detected, and
  determining the condition of at least one structural part of the mobile working machine based on the change in the position of the first structural part with respect to the second structural part as a function of the force detected,
  wherein determining the condition of at least one structural part comprises determining at least one of the following: a clearance of a structural part, a clearance of a joint of two structural parts, a deformation of a structural part, a deformation of a joint of two structural parts, a flex of at least one structural part, and a leak of a structural part, and
  wherein the force is applied to the first structural part by an actuator of the mobile working machine, at least one structural part of the mobile working machine or by an actuator external to the mobile working machine.

* * * * *